United States Patent [19]
Calvert et al.

[11] 3,876,602

[45] Apr. 8, 1975

[54] PARTICULATE CATALYST INJECTION METHOD IN POLYOLEFIN PRODUCTION

[75] Inventors: William Lamont Calvert, Westfield; Richard Herman Handwerk, Somerville, both of N.J.

[73] Assignee: Union Carbide Corporation, New York, N.Y.

[22] Filed: June 14, 1973

[21] Appl. No.: 369,865

Related U.S. Application Data

[62] Division of Ser. No. 202,108, Nov. 26, 1971, Pat. No. 3,779,712.

[52] U.S. Cl. ... 260/94.9 P; 260/88.2 R; 260/94.9 D; 260/94.9 DA
[51] Int. Cl. ......... C08f 1/00; C08f 1/98; C08f 3/06
[58] Field of Search .... 260/94.9 P, 94.9 DI, 94.9 D, 260/88.2 R

[56] References Cited
UNITED STATES PATENTS

| | | | |
|---|---|---|---|
| 3,012,024 | 12/1961 | Kavesh | 260/94.9 P |
| 3,023,203 | 2/1962 | Dye | 260/94.9 P |
| 3,298,792 | 1/1967 | DiDrusco | 260/94.9 P |
| 3,709,853 | 1/1973 | Karapinka | 260/94.9 P |
| 3,779,712 | 12/1973 | Calvert et al. | 260/94.9 P |

FOREIGN PATENTS OR APPLICATIONS

| | | | |
|---|---|---|---|
| 503,740 | 6/1951 | Belgium | 260/94.9 P |

*Primary Examiner*—Harry Wong, Jr.
*Assistant Examiner*—A. Holler
*Attorney, Agent, or Firm*—James J. O'Connell

[57] ABSTRACT

Apparatus is provided for injecting finely divided solid materials into a reaction zone. The apparatus includes a reservoir, selected means for advancing a predetermined particle size of solid materials to the lower portion of the reservoir, metering means for metering predetermined amounts of solid materials selected by the selecting means to gas entrainment means and conduit means to deliver gas entrained solid material into a reaction chamber, the conduit means including a capillary tube having an inside diameter of 0.030 to 0.125 inches. A method for injecting finely divided solid materials into a polymerizing reaction chamber for producing polyolefin is also included.

9 Claims, 5 Drawing Figures

PARTICULATE CATALYST INJECTION METHOD IN POLYOLEFIN PRODUCTION

This patent application is a division of application Ser. No. 202,108 filed Nov. 26,1971 which issued on Dec. 18, 1973 as U.S. Pat. No. 3,779,712.

The present invention relates to an apparatus and method for injecting particulate solids into a reaction chamber and more particularly to an apparatus and method for continuously injecting particulate solid catalyst materials into a rection chamber as a dispersion of such material in a carrier gas. The invention is further especially concerned with the provision of an apparatus including a novel injection device for injecting finely divided catalyst materials dispersed in a carrier gas, into a reaction chamber utilized for the production of poly(olefin).

Current techniques for the production of polyolefins generally include a slurry process wherein a polymer is prepared in a suitable solvent under constant agitation in the presence of a low pressure catalyst. The slurry process, however, is not the panacea inasmuch as the solvent utilized must be recovered at some operating cost and at the expense of solvent depletion. In addition, the formed polymer usually contains amounts of solvent which adversely affect some of the physical properties of the final product. Moreover, the physical properties of the slurry are such that large volumes of solvent must be employed in order to insure that an agitatable mass will be maintained.

In order to alleviate some of the disadvantages of the slurry process, the art has resorted to the well-known "fluidized bed" technique for the production of poly(olefins) which does in fact eliminate some or all of the disadvantages of the slurry process. According to this technique, solid particulate olefin polymers are obtained by continuously contacting a gaseous stream containing a polymerizable olefin with a powdery catalyst for said olefin in a polymerization reaction zone.

A currently favored "fluidized bed" method for the manufacture of a polyolefin requires the introduction of a particulate (finely divided), solid catalyst into a reaction chamber, whereby gaseous monomer, at a pressure substantially above atmospheric, is caused to polymerize. Ideally, the catalyst should be introduced continuously in order to maintain steady state conditions in the reaction zone. Practically, however, in the absence of any known technique for achieving successful continuous catalyst injection, it has been common practice to inject the catalyst in intermittent "shots" into the reaction zone.

The device commonly employed for this purpose is known in the art as a "shot feeder," which generally includes a "shot tube" comprising a chamber equipped with valves at its upper and lower ends and which functions as follows: The upper valve is opened to admit catalyst; the upper valve is closed and the chamber pressurized with inert gas; the lower valve is opened briefly to permit the "shot" of catalyst to be propelled into the reaction zone via an injection tube by the higher pressure gas. The entire catalyst feed system which includes a catalyst reservoir, valve actuators, timers and circuitry for automatic cycling, safety interlocks, means for purging, etc. is highly complex and subject to frequent and costly maintenance. In addition, optimal operation of the "shot feeder" involves a compromise between two normally unacceptable extremes. On the one hand, rapid cycling favors steady reaction conditions but results in frequent malfunction and prohibitive maintenance. On the other hand, infrequent injection of large "shots" of catalyst results in temperature fluctuations, product nonuniformity and increased chunk formation in the reactor.

During the course of extensive efforts directed towards providing a continuous catalyst feeder system which could be utilized in poly(olefin) production, we investigated the factors which contributed to the unsatisfactory operation of the "shot feeder" technique.

We have discovered during the course of our investigation that a satisfactory continuous catalyst feeder system for poly(olefin) production has been blocked by the existence of two apparently irreconcilable constraints, i.e., a high velocity of inert carrier gas must be maintained to keep the catalyst in suspension and to prevent monomer from migrating back up the injection tube where it would polymerize and block the flow, and in addition, a significant quantity of inert carrier gas entering the reaction zone cannot be tolerated because of its adverse effect on the productivity of the system. Calculations of gas flow versus flow rate in any "reasonable size" injection tube indicated the impossibility of maintaining an adequate velocity without exceeding permissible flow rates to the reactor. As a matter of fact, experience with the plugging of injection tubes in the size range of one-half inch to 1 inch diameter supported the conclusion that smaller tubes would not be "reasonable."

In the light of all the theory and data which suggested that injection tubes in a size substantially less than one-half inch in diameter would cause serious operating difficulties, we nevertheless tried an injection tube a full order of magnitude smaller than previously thought reasonable and found surprisingly and contrary to normal expectations that this "microscale" or capillary injection system made it possible to reconcile continuous catalyst feeding with the two previously mentioned constraints, i.e., (1) maintaining a sufficiently high velocity of carrier gas to prevent settling out of catalyst or backflow of monomer, and (2) limiting total flow of inert carrier gas to an amount which will not impair the performance of the reactor.

It is therefore an object of the present invention to provide an apparatus and method for injecting particulate solids into a reaction chamber.

Another object is to provide an apparatus and method for continuously injecting particulate solid catalyst materials into a reaction chamber as a dispersion of such material in a carrier gas.

Another object is to provide a continuous method and an apparatus for producing poly(olefins) whereby product quality and uniformity are improved.

A further object is to provide an apparatus for poly(olefin) production wherein generation of large chunks of polymer in the reactor is greatly reduced and wherein formation of undispersed catalyst clumps are totally eliminated.

These and other objects of the present invention will become more apparent from a consideration of the following description and drawings in which:

FIG. 3 is an exploded partially sectioned view taken along the line 3—3 of FIG. 2;

FIG. 5 is a view in cross-section showing the means for removing the capillary tube from the reactor.

Figure 1:
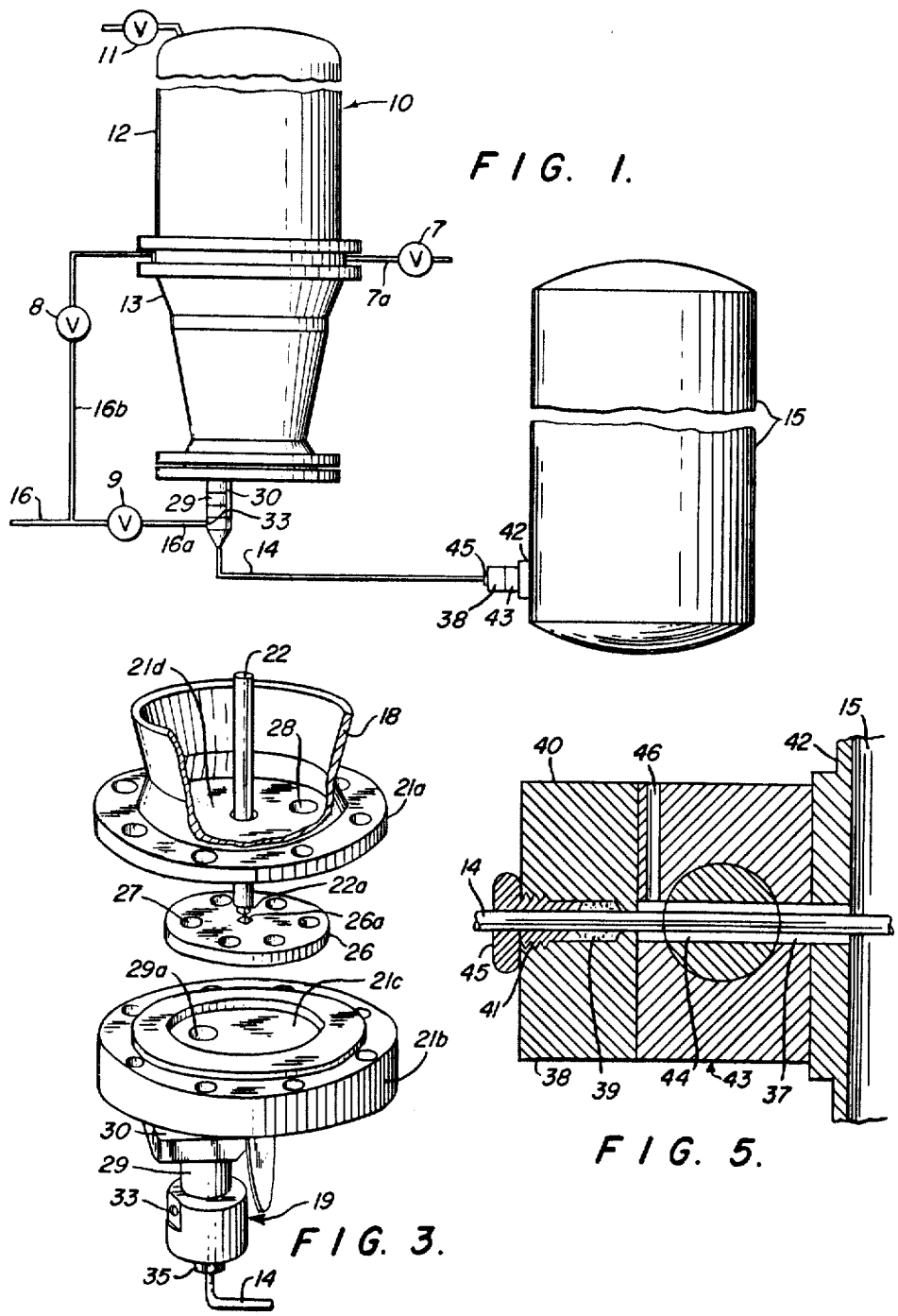
FIG. 1 is a diagrammatic illustration of a system for feeding finely divided catalyst to a reactor for polymerizing monomers to produce poly (olefin)

Referring to the drawings in greater detail, in the system as diagrammatically illustrated by FIG. 1, the numeral 10 designates a conventional catalyst reservoir apparatus which receives catalyst in finely divided form through inlet valve 11. The reservoir 10 includes an upper, dome or body portion 12 and lower or base portion 13. The feeding mechanism of the apparatus is substantially contained in the lower or base portion 13.

The lower portion 13 is connected in turn to a capillary tube 14 communicating with apparatus for treatment or employment of finely divided, powdered material such as a reactor vessel 15.

The gas conduit 16 provides for the introduction of a gas material into the entrainment chamber 29 of lower portion 13 of the reservoir 10 for purposes, later described, and also to provide a carrier gas for transporting solid materials admitted to the lower portion of reservoir 10 and thereafter through the capillary tube 14 to the point of use or treatment as represented by reaction vessel 15.

A gas flow control valve 9 is positioned on gas conduit 16a for the purpose of controlling gas flow in the entrainment section 29. A pressurization valve 8 is positioned on gas conduit 16b which is adapted to control the admission of high pressure gas to the reservoir during start-up procedures. As will be seen from FIG. 1, gas conduit 16b terminates at one end at approximately a site in reservoir 10 intermediate the upper and lower portion of the reservoir.

Vent valve 7, positioned on vent conduit 7a relieves reservoir pressure prior to charging solid catalyst material to reservoir 10. Gas conduits 16a and 16b receive a gas supply through conduit 16 from a high pressure source (not shown).

Figure 2:
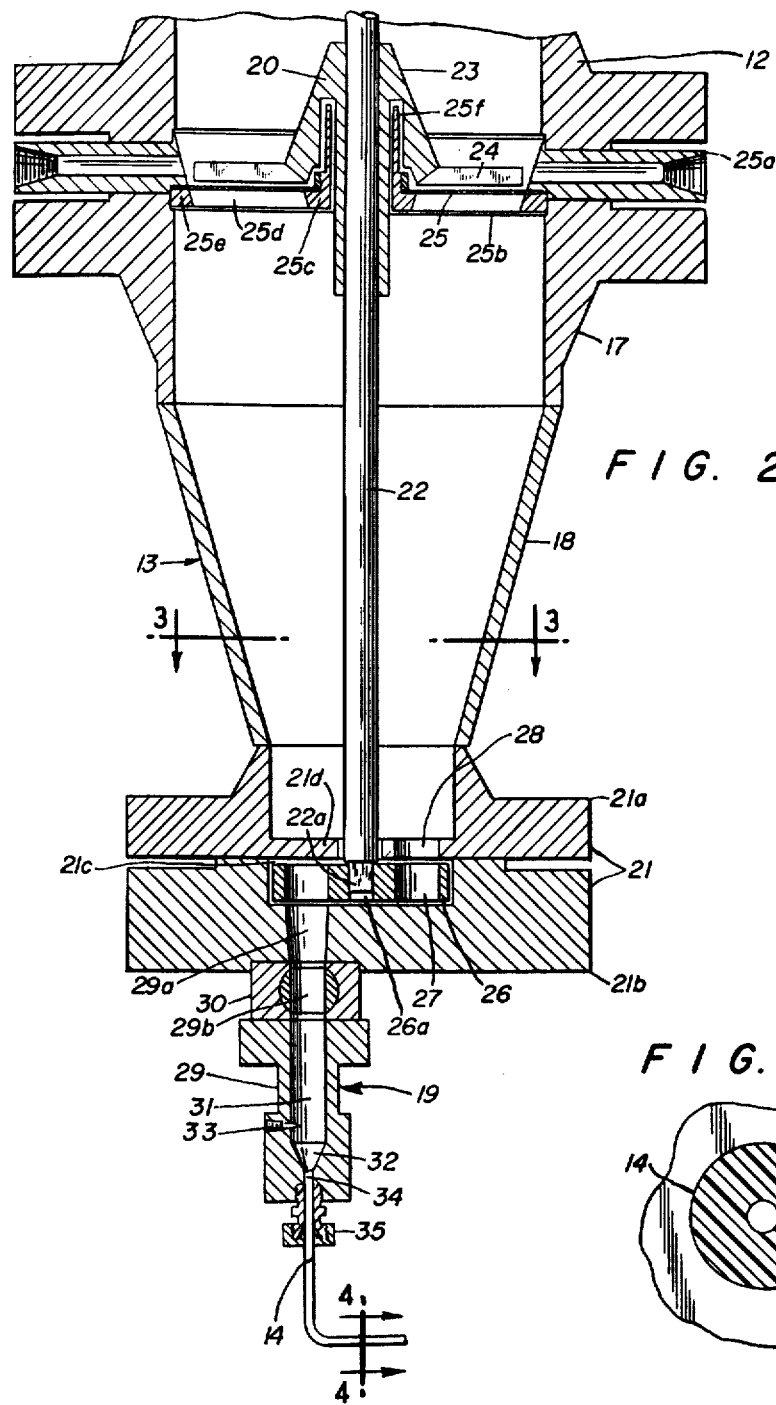
FIG. 2 is an enlarged fragmentary portion of the reservoir as shown in FIG. 1.

Referring to FIG. 2 (which for purposes of simplicity shows the reservoir 10 without its upper or so-called dome portion), there is shown an enlarged fragmentary view of reservoir feeder 10 which is composed of lower portion 13, which when taken together with the upper portion (not fully shown) form a storage vessel for finely divided materials. The lower portion 13 of the reservoir 10 is formed by means of a flange 17 joined at its upper end to the bottom of the upper portion of reservoir 10, and a lower casing section 18 of substantially inverted conical form joined to the upper end of the catalyst entrainment section 19, by a flange type connection 21. Any suitable means may be provided for assembling the several portions and sections of the casing elements of the reservoir 10 such as by welding or flange connections as shown.

A rotatable shaft member 22 extends downward into the reservoir 10 through the top thereof, being provided for fluid-tight relation such as by means of a packing gland and the like. The shaft 22 is generally cylindrical in nature having a squared section 22a at its lower extremity and is guided radially and supported axially by means of bearings (not shown) disposed at the top of reservoir 10. Rotatable shaft member 22 terminates at its lower end by engaging the square section 22a in a corresponding recess 26a in metering disc 26.

Suitable means, not shown, are provided for driving the shaft 22 at variable rates of speed as required.

Mounted coaxially on the shaft 22 and situated above casing 13 is an agitator 23 which includes a hub section 20 having wing sections 24 extending outwardly therefrom. The agitator serves to shake or agitate the solid catalyst material fed into the reservoir 10. Although two wing sections are illustrated, it will, of course, be understood that additional wing sections can be added in order to acheive the desired degree of agitation.

In order to successfully and efficiently produce poly-(olefin) it is necessary that the particle size of the solid catalyst material be controlled, i.e., that the catalyst material fed to the reactor 15 be below a certain diameter. Provision is made for the control of particle size of solid catalyst material by utilization of a screening section which includes a screen 25, annular flange spacer 25a disposed intermediate the upper portion 12 and lower portion 13 of reservoir 10 and a screen support frame 25b secured to the underside of flange spacer 25a. Screen 25 is concentrically disposed with respect to shaft 22 and has its outer periphery mounted between screen support frame 25b and flange spacer 25a. The screen support frame 25b includes an inner hub 25c having radially extending arms 25d terminating in an outer rim 25e. The inner hub 25c has an elevated cylindrical portion 25f adapted to occupy the annular recess in agitator hub 20 and is adapted to prevent material from bypassing screen 25. As will be seen in FIG. 2, screen 25 occupies a plane immediately below agitator 23 and is of the desired mesh size consistent with the size of particles desired. As shown in FIGS. 2 and 3, mounted coaxially on shaft 22 within flange type connection 21 is metering disc 26 havng a series or plurality of cavities 27 circularly arranged in spaced relation proximate to the peripheral edge of the metering disc 26 and which extend through the metering disc 26. Although the cavities 27 are shown as being circular in nature, it will, of course, be understood that their configuration is subject to extensive variation such as in the form of tapered, elongated or diamond-shaped cavities. A port 28 situated at the bottom of lower portion 13 of reservoir 10 permits the dry particulate catalyst material to fall into any cavity 27 in alignment therewith. The metering disc 26 is accommodated in a circular recess 21c in lower flange 21b and its central portion accommodates in fixed relation the squared section 22a of shaft 22. Thus when shaft 22 is rotated, the metering disc is likewise caused to rotate in the direction of rotation of shaft 22. Situated immediately above metering disc 26 at the bottom of reservoir 10 is a baffle 21d formed by the inward extension of upper flange 21a. Thus, solid material is gravity fed through port 28 into each metering disc cavity 27 in sequence as controlled by the rotation of shaft 22.

As the metering disc 26 rotates, each cavity 27, filled with the catalyst material through port 28, sequentially aligns with inlet 29a, in the entrainment chamber 29 and as a result the catalyst is introduced into the entrainment chamber 29. As will be seen from FIGS. 2 and 3, the entrainment chamber 29 extends below the lower casing section 18 and is secured thereto by means of flange connection 21. The entrainment section includes inlet 29a, port 29b of reservoir discharge valve 30, and an elongated cylindrical tube 31 terminatiing at its lower end in apex 32. Situated in the cylindrical tube 31 is a tangential side entrance port 33 for the admission of gas from a high pressure gas supply as shown in FIG. 1. Not fully illustrated are the means for controlling the flow rate of gas since there are various well-known techniques for this purpose. The pressurized gas entering the entrainment chamber 29 through tangential port 33 is at a pressure substantially equal to the pressure in the reservoir 10 and greater than the pressure in the reactor vessel 15. As a result, the pressurized gas which entrains the catalyst material in the apex section of the cylindrical tube 31 leaves the tube through discharge port 34 situated at the base of the entrainment chamber 29 and enters capillary tube 14.

The capillary tube 14 is detachably secured to the base of the entrainment chamber by any known conventional means such as by provision of a standard tube coupling 35.

Figure 4:
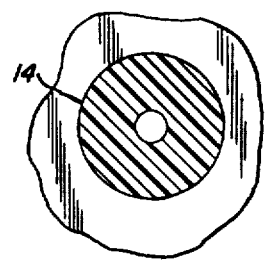
FIG. 4 is a cross-sectional view of the capillary tube taken along the line 4—4 of FIG. 2.

Referring to FIG. 4, the capillary tube 14 can be formed of any material which is adapted to withstand the various pressures exerted upon it by the pressurized gas. Merely as illustrative, the capillary tube can be fabricated from such materials as stainless steel, brass, plastic, and like materials. A critical feature of the present invention is the size of the inside diameter of the capillary tube 14. Generally speaking, we have found that three times the largest particle dimension is a practical lower limit for the inside diameter of the capillary tube to assure reliable flow. Given a maximum flow of carrier gas which is permissible in the reactor vessel 15, the capillary tube 14 must be no larger than that which will produce a velocity sufficient to: (a) prevent migration of reactive monomer from the reactor vessel 15 back upstream into the capillary tube, and (b) prevent entrained catalyst from settling out in the capillary tube.

Merely as illustrative, in producing poly (ethylene) utilizing a solid catalyst having a maximum particle diameter of 0.010 inch and a maximum tolerable carrier gas flow of approximately 15 pounds per hour, capillary tubes having inside diameters of 0.030 to 0.125 inch can be employed, preferably capillary tubes having inside diameters of 0.030 to 0.090 inch.

Referring to FIG. 5, it will be seen that the capillary tube 14 enters the reactor vessel 15 through a reactor port 37 disposed in the wall of the reaction vessel 15. It will, of course, be understood that it may be necessary to completely remove the capillary tube for service or replacement without loss of reactor contents. Provision is made for removal of the capillary tube 14 by means of a valve and seal assembly so disposed that the capillary tube can be withdrawn to a position such that it terminates between the valve and the seal, at which time the valve can be closed and the capillary tube completely removed Situated adjacent the reactor wall 42 of reactor vessel 15 is a conventional or plug valve 43 having a passage 44, which during operation is in alignment with port 37 thereby permitting the capillary tube 14 to pass therethrough into the reaction vessel 15. Adjacent valve 43 is a packing gland seal 38 which as shown includes a resilient packing material 39, a housing 40 and an inner portion 41, defining a partially threaded passageway adapted to receive a packing follower 45. By virture of this arrangement, when it is desired to remove the capillary tube 14 for servicing or replacement, the operator withdraws the capillary tube 14 from the reactor wall 42 to a position such that it terminates between the valve 43 and packing gland seal 38 at which time the valve 43 may be closed and the capillary tube 14 removed without loss of the reactor content.

During reactor 15 operation, it is desirable to keep passge 44 and port 37 free from polymerized material which would normally accumulate in this annular space. Provision is made to prevent migration of catalyst and/or product into port 37, and passage 44 by introduction of monomer gas (ethylene) or other gas through purge port 46 disposed in valve 43.

In a representative technique of operation, the reservoir is charged with catalyst by the following sequence of operations: The discharge valve 30 is closed to isolate the reservoir 10 from the reactor 15. The reservoir 10 is thereafter vented by opening vent valve 7 in order to relieve pressure in reservoir 10. In addition, any finely divided material which did not pass through screen 25 is removed at this time through the vent valve 7. After desirable pressures are obtained in reservoir 10, the vent valve 7 is closed. In order to introduce catalyst into reservoir 10, inlet valve 11 is opened permitting inflow of catalyst through inlet valve 11 into reservoir 10 from a catalyst through inlet valve 11 into reservoir 10 from a catalyst storage source, (not shown).

After introduction of the required amount of catalyst material, inlet valve 11 is closed and pressurization valve 8 is opened to restore the desired pressure in reservoir 10, i.e., equal to the pressure in entrainment chamber 29. Upon obtaining desired pressurization in reservoir 10, the pressurization valve 8 is closed and reservoir discharge valve 30 is opened to permit feed of catalyst. Catalyst feed is effected by rotation of the shaft 22 and thereby metering disc 26, whereby the powdered material is deposited into cavities 27 through port 28 of the reservoir 10 and rotated in position over the entrainment chamber 29. A gaseous material is supplied through side port 33 at a pressure maintained at a level higher than that of the reactor vessel 15 to which capillary tube 14 is connected. As a result, fluid flow from the interior of the lower portion of cylindrical tube 31 through capillary tube 14 and into reactor vessel 15 is effected. The velocity of flow through the capillary tube 14 is to be maintained at a level sufficient to carry the powdered material discharged from the entrainment chamber 29 as a dispersion or suspension in the injected gaseous material. In general a flow of about 10 to about 150 feet/sec. through the capillary tube is effective for this purpose, preferably 40 to about 100 feet per second.

The term "finely divided solid material" as employed herein means a dry particulate solid material having free-flowing particles ranging from abut 0.010 to about 0.030 inches in their greatest diameter.

A typically finely divided solid material would be catalyst materials generally in the form of powdery, free-flowing solid particles and are preferably capable of subdivision. Subdivision is the ability of the catalyst particles to rupture in the presence of a growing polymer and thereby extend itself to form many polymer particles of low residue from a single catalyst particle. The catalyst may be supported on a carrier or unsupported as ground or spray dried particles.

Supported catalysts are prepared, for instance, by adding a carrier to a solution of the catalyst and evaporating the catalyst solvent with dry nitrogen to yield a support catalyst in the form of a dry, free-flowing powder. If the carrier is porous, careful consideration must be given to the size of the support. When incorporated in a porous support, the catalyst forms active sites on the surface and in the pores of the support. While not bound by this theory, it is believed that the polymers begin to grow at the surface as well as in the pores of the catalyst. When a pore grown polymer becomes large enough, it ruptures the support thereby exposing fresh catalyst sites in the inner pores of the support.

Besides porous supports such as silica, alumina, thoria, zirconia and the like, other supports such as carbon black, micro-crystalline cellulose, the non-sulfonated ion exchange resins and the like may be used.

In selecting the catalyst support, consideration must also be given to the possibility of competing reactivity of the support for the olefin. Silica, for instance, tends to compete with the catalyst when propylene is being polymerized as the sole monomer and tends to cause the formation of low molecular weight propylene waxes. its use, therefore, should be avoided in the preparation of polypropylene. It does not, however, appear to adversely affect the catalyst where copolymers of ethylene and propylene are produced.

An unsupported catalyst is prepared, for instance, by spray drying the catalyst or spraying the catalysts directly into a bed of polymer particles and evaporating the catalyst solvent. Both techniques produce dry catalysts which are capable of subdivision used in a polymerization system to produce polyolefin. Any polymerizable olefin can be employed in the present invention, preferably those olefins containing from 2 to about 8 carbon atoms, and even more preferably those containing from 2 to 4 carbon atoms. It only is essential that the olefins be gaseous and polymerize at a temperature below the sintering temperature of the resultant polymer and form essentially dry particulate resin particles essentially free of low molecular weight waxes and greases.

The olefins can be homopolymerized or copolymerized. Copolymerization includes the formation of polymers from two or more monomers such as random copolymers as well as the production of specialty polymers. For instance, different monomers may be sequentially introduced into the reactor to form block copolymers. In general the powdered catalyst material would have a particle size ranging from about 0.010 to about 0.030 inches in their greatest diameter.

The gaseous material supplied as the carrier can be any suitable gaseous material which is dry and non-injurious in the polymerization reaction contemplated. Nitrogen is a suitable gaseous material.

The rate at which the solid materials are fed into the entrainment chamber 29 will be determined and can be controlled by varying the speed of the rotation of the shaft 22 and thereby the metering disc 26. As will be concluded from the foregoing, there is produced a method for producing polyolefin which method comprises introducing a gas stream containing a finely divided solid catalyst material, having a maximum diameter of 0.010 inches into a reaction zone containing a polymerizable olefin, said gas stream being introduced into said reaction zone through an elongated, cylindrical zone having an inside diameter of 0.030 to 0.125 inches and maintaining the reaction for a sufficient period of time to produce polyolefin in said reaction zone.

Temperatures in the reaction zone are generally maintained below the sintering point of the polymer particles. To insure that sintering will not occur, operating temperatures considerably below the sintering temperature are desired. For the production of homopolymers, an operating temperature of from about 90° to about 110°C. is preferred whereas an operating temperature of about 90°C. or lower is preferred for copolymers.

Operation in the reaction zone is at a pressure of from about 40 to 300 psi or more with operation at intermediate and elevated pressures favoring heat transfer as an increase in pressure increases the unit volume heat capacity of the gas.

Although the apparatus shows the feeding of the finely divided catalyst material to the entrainment chamber 29 by means of metering disc 26, other techniques for feeding the catalyst materials can be utilized such as by providing a vibrator assembly as is well known in the art. The critical feature of the apparatus is the capillary tube system which, as mentioned previously, eliminates the disadvantages commonly encountered in the art.

What is claimed is:

1. A method for producing polyolefin by catalytically polymerizing a first gaseous stream of polymerizable olefin monomer in the reaction zone of a fluidized bed reactor said first gaseous stream of polymerizable monomer being continuously fed to said reaction zone while said reaction zone is maintained at a pressure which is substantially above atmospheric pressure and at a temperature which is below the sintering temperature of said polyolefin which comprises introducing a pressurized second gas stream containing a finely divided solid olefin polymerization catalyst in the form of free flowing particles having a maximum particle size of about 0.030 inches in their greatest diameter into the polymerizable monomer in said reaction zone, said second gas stream being introduced into the polymerizable monomer in said reaction zone under a pressure greater than that in said reaction zone and through an elongated, cylindrical zone having an inside diameter which is at least approximately three times the largest diameter of said particles, and maintaining the contact of said catalyst with said first gaseous stream under said temperature and pressure in said reaction zone for a sufficient period of time to produce polyolefin in said reaction zone.

2. A method as in claim 1 in which said reaction zone is maintained at a pressure of about 40 to 300 psi.

3. A method as in claim 2 in which second gas stream is introduced into said reaction zone at a velocity of about 10 to about 150 feet per second.

4. A method as in claim 3 in which said second gas stream is introduced into said reaction zone at a velocity of about 40 to about 100 feet per second.

5. A method as in claim 1 for producing polyolefin by catalytically polymerizing ethylene at a pressure of about 40 to 300 psi and at a temperature of about 90° to 110°C. and wherein said second gas stream is introduced into said reaction zone at a velocity of about 10 to about 150 feet per second.

6. A method as in claim 1 in which said olefin polymerization catalyst has a particle size of about 0.010 to about 0.030 inches in its greatest diameter.

7. A method as in claim 6 in which said elongated cylindrical zone has an inside diameter of 0.030 to 0.125 inches.

8. A method as in claim 7 in which said elongated cylindrical zone has an inside diameter of 0.030 to 0.090 inches.

9. A method as in claim 7 for producing polyolefin by catalytically polymerizing ethylene at a pressure of about 40 to 300 psi and at a temperature of about 90° to 110°C. and wherein said second gas stream is introduced into said reaction zone at a velocity of about 10 to about 150 feet per second.

* * * * *